Figure 1:
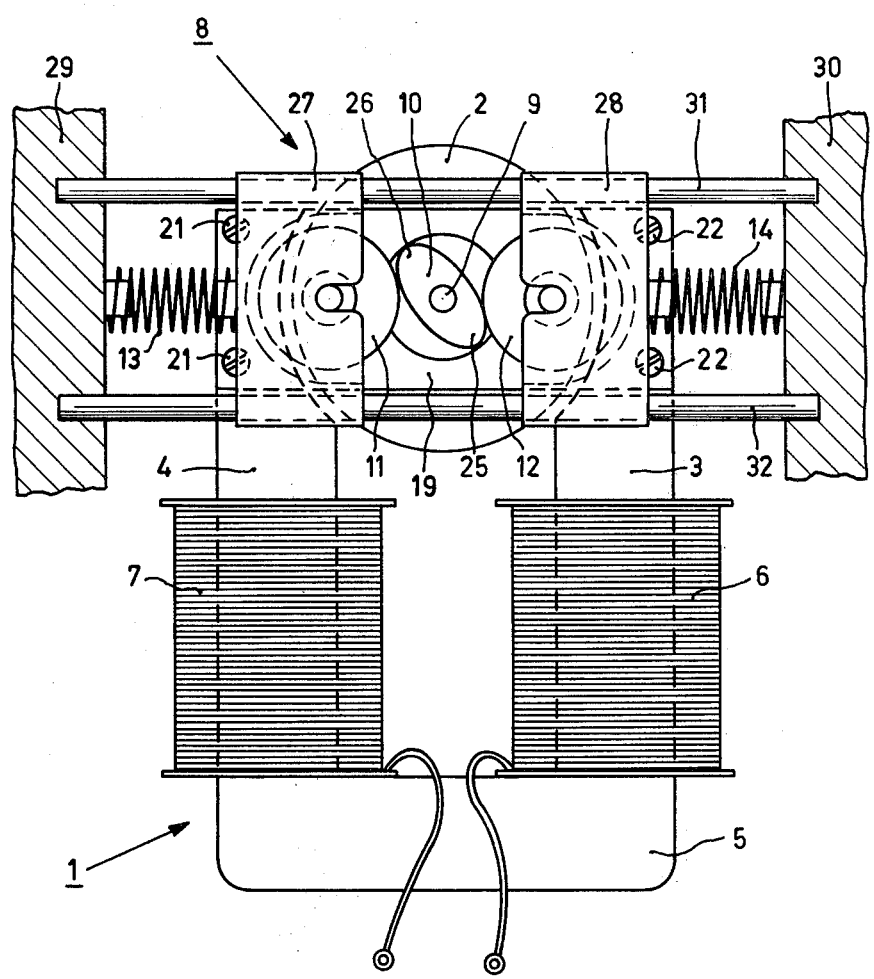

United States Patent [19]
Poel

[11] B 3,984,710
[45] Oct. 5, 1976

[54] SYNCHRONOUS MOTOR STARTING MEANS

[75] Inventor: Hendrik Poel, Drachten, Netherlands

[73] Assignee: U.S. Philips Corporation, New York, N.Y.

[22] Filed: Mar. 25, 1975

[21] Appl. No.: 561,784

[44] Published under the second Trial Voluntary Protest Program on January 27, 1976 as document No. B 561,784.

[30] Foreign Application Priority Data
Apr. 5, 1974   Netherlands..................... 7404656

[52] U.S. Cl.................................. 310/41; 310/162
[51] Int. Cl.² ................................ H02K 7/118
[58] Field of Search................ 310/41, 162–165, 310/156

[56] References Cited
UNITED STATES PATENTS
2,078,257   4/1937   Liner ............................... 310/41 X
3,333,125   7/1967   Grabow ............................. 310/41
3,860,841   1/1975   Jullien-David ..................... 310/41

FOREIGN PATENTS OR APPLICATIONS
1,460,560   10/1966   France ............................. 310/41
  550,809    1/1943   United Kingdom ................... 310/41

Primary Examiner—Donovan F. Duggan
Attorney, Agent, or Firm—Frank R. Trifari

[57] ABSTRACT

An apparatus with a synchronous motor which is provided with a diametrically magnetized permanent-magnet rotor. The apparatus comprises a starting device for the motor which consists of a cam disc which is mounted on the shaft of the rotor of the motor and one or more spring-loaded pressure members which co-operate therewith during starting and which are movable transverse to the centre line of the rotor shaft.

4 Claims, 4 Drawing Figures

SYNCHRONOUS MOTOR STARTING MEANS

The invention relates to an apparatus which comprises a synchronous motor provided with a diametrically magnetized permanent-magnet rotor, which is disposed between the free ends of the legs of a U-shaped stator core with coils which are disposed around the legs.

Permanent magnet motors of said type are attractive for use in minor domestic appliances for various reasons. They comprise no commutator and brushes and are consequently of simple construction. The absence of a commutator and brushes also means the absence of a possible source of motor interference. However, a peculiarity of said type of motor is that when the motor is energized it exhibits no preference for either of the two possible directions of rotation. Thus, the motor may start rotating both clockwise and anti-clockwise. This is not always a problem, for example a hair-brush is known which is provided with two reciprocating brushes which are driven by a synchronous motor of the type which is discussed. Driving is effected by means of a crank slot mechanism, so that the starting direction of the motor does not influence the operation of the hair brush.

However, a problem which may occur in some cases is that the rotor after the motor has been switched off has come to a standstill in such a position that when it is turned on again it will neither start in the one direction nor in the other direction, but will perform an oscillating motion about its position of equilibrium. It is an object of the invention to provide a solution to this problem, and the invention is characterized in that the apparatus comprises a starting device which is provided with a cam disc which is disposed an the rotorshaft,
one or more pressure members which during starting co-operate with the cam disc, which are movable transverse to the centre line of the rotor shaft and are movably connected to stationary members which are connected to the stator, and
resilient means for loading said pressure members in the direction toward the cam disc.

With the motor according to the invention after the motor has been switched off, the rotor is brought into a specific position by means of the pressure members and the force exerted on them by the springs. When the motor is started again the rotor is then always in a suitable starting position.

An embodiment of the invention is characterized in that the mechanical vibration system(s), comprising the pressure member(s), the movable parts connected thereto and the resilient means, has (have) a resonant frequency which is substantially higher than the frequency with which the pressure member(s) is (are) excited by the cam(s) disposed on the cam disc during operation of the motor.

The high resonant frequency of the mechanical vibration system or the mechanical vibration systems, guarantees that during operation of the motor the pressure members are always in contact with the cam disc, so that undesirable rattling noises and an undesirable fluctuating load of the cam disc and the components which co-operate therewith are avoided.

A further embodiment is characterized in that the cam disc is provided with two cams which are diametrically opposed,
two pressure members are provided which are disposed opposite each other,
the pressure members consist of pressure rollers,
the pressure rollers are each rotatable in a movable slide, and
each slide is loaded in the direction of the rotor shaft by means of a helically wound pressure spring.

Yet another embodiment, in which during operation of the motor the cam disc is not in contact with the pressure members, is characterized in that the apparatus further comprises:

a manually movable actuating member for switching on and off the motor, and
movable means which are mechanically connected to the actuating member for lifting the pressure members off the cam disc against the pressure of the said resilient means at the end of the switching-on movement of the actuating member.

Figure 2:
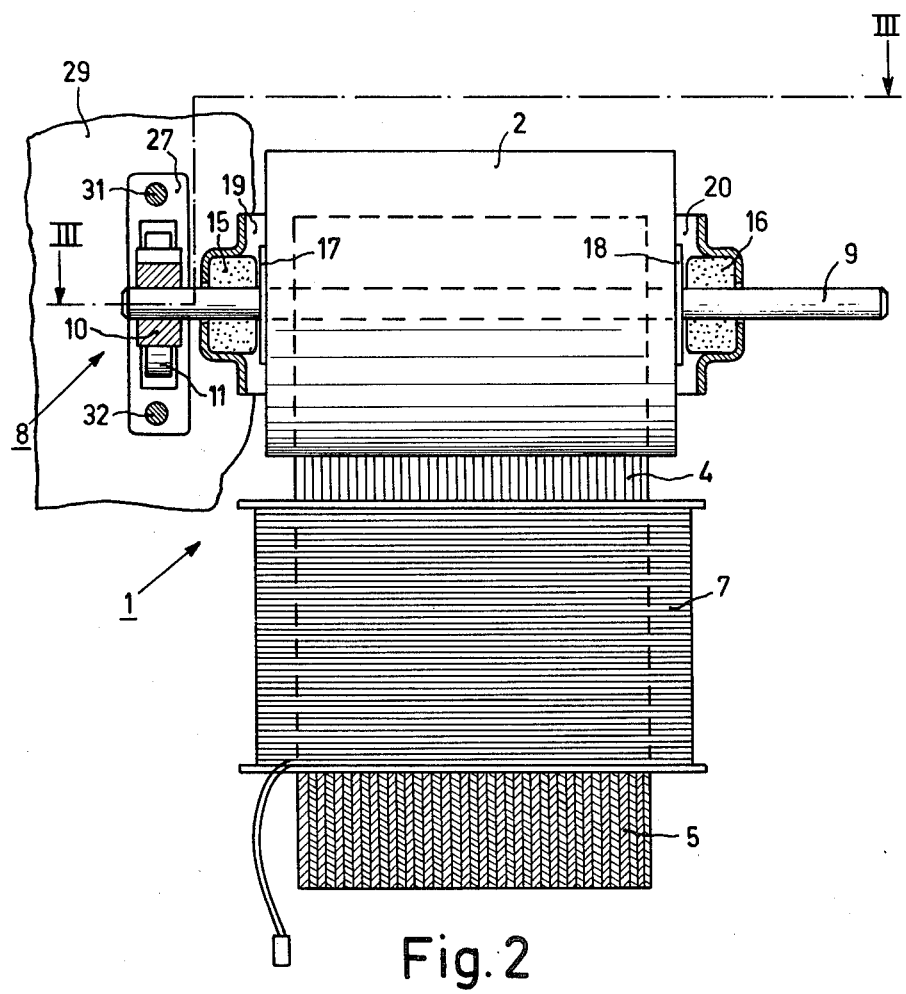
Figure 3:
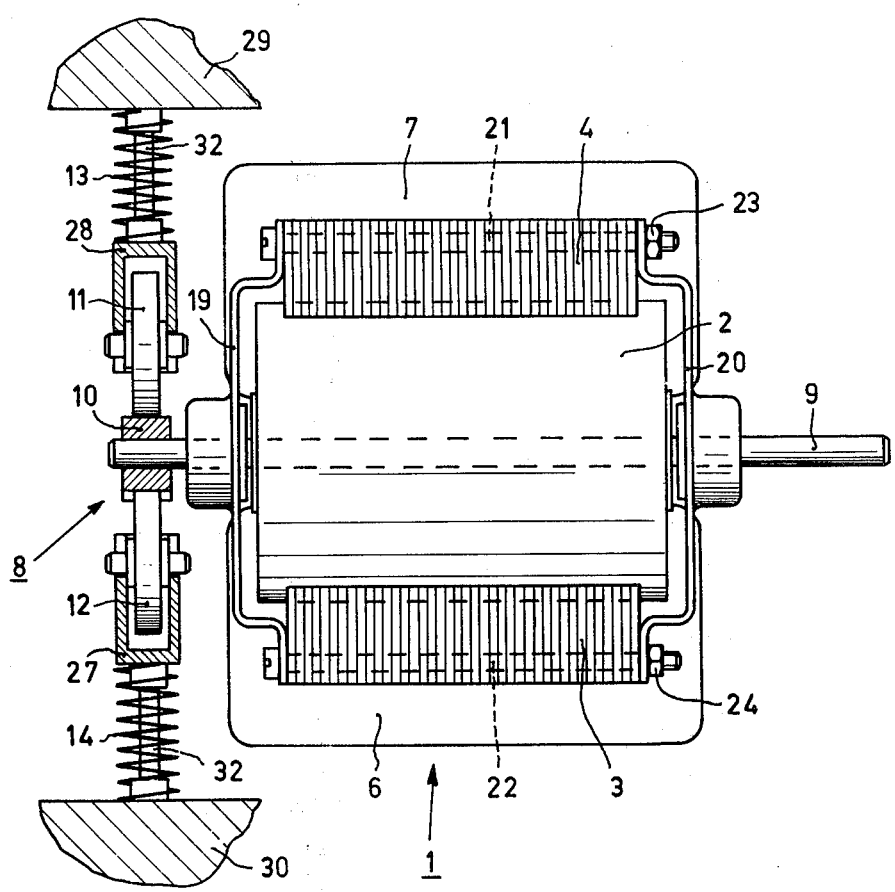
Figure 4:
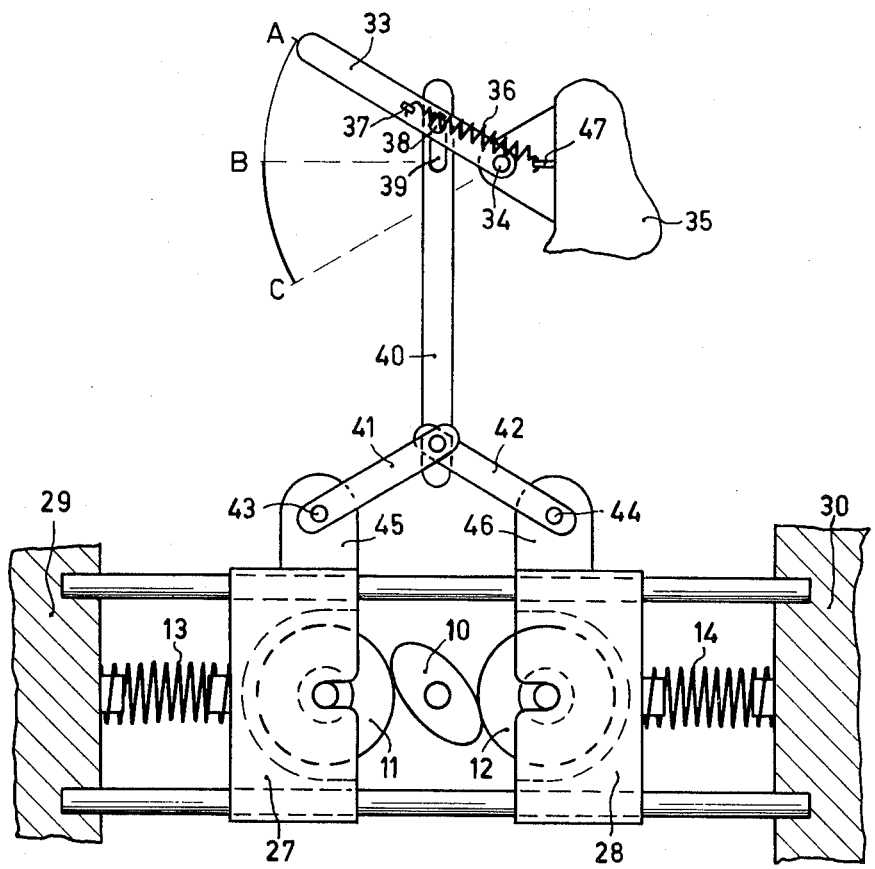

The invention will now be described in more detail with reference to the drawing, in which:

FIG. 1 is a schematical front view of a synchronous motor with a starting device, FIG. 2 is a cross-section of the apparatus of FIG. 1, but in which the rotor and the rotor shaft are not shown in cross-section for clarity, FIG. 3 is a sectional view in accordance with the arrows III—III in FIG. 2, and FIG. 4 schematically shows a modification of the starting device of FIG. 1, In the various Figures corresponding components are designated by corresponding reference numerals.

In the Figures the synchronous motor is denoted by the reference numeral 1. The motor has a permanent-magnet diametrically magnetized rotor 2, which is disposed between the free ends of the legs 3 and 4 of a U-shaped stator core 5. On the legs 3 and 4 coils 6 and and 7 are disposed. The starting device is designated 8 and comprises a cam disc 10 which is disposed on the shaft 9 of the rotor 2, which cam disc during starting co-operates with pressure members which take the form of rollers 11 and 12, which are movable transverse to the centre line of the rotor shaft 9. Said rollers are loaded by the pressure springs 13 and 14 in the direction toward the cam disc 10.

The rotor shaft 2 is journalled in two sintered metal bearing bushes 15 and 16. Between the rotor 2 and the bearing bushes nylon rings 17 and 18 are disposed. The bearing bushes 15 and 16 are mounted in bearing brackets 19 and 20 which are made of sheet steel. Said brackets are attached to the stator core 5 by means of through-bolts 21 and 22 and the associated nuts 23 and 24.

The cam disc 10 has two cams 25 and 26 which are diametrically opposed to each other. The pressure rollers 11 and 12 are each rotatable in a movable slide 27 and 28 respectively. The two slides 27 and 28 are loaded in the direction of the rotor shaft 9 by the pressure springs 13 and 14. With their ends which are remote from the rotor shaft 9 they bear against the parts 29 and 30 which are rigidly connected to the apparatus which incorporates the motor and the starting device. The motor is also rigidly connected to the apparatus, but this is not shown in the Figures. The two slides 27 and 28 are movable on the rods 31, and 32, which are rigidly connected to the fixed parts 29 and 30.

The operation of the apparatus of FIGS. 1 through 3 is as follows: the end of the rotor shaft 9 which is remote from the cam disc 10 is used for driving a part to be driven of the apparatus which incorporates the synchronous motor. The cam disc 10 is a tight fit on the other shaft end and the line of symmetry of the diametrically opposed cams 25 and 26 substantially coincides with the direction of magnetization of the diametrically magnetized permanent-magnet rotor 2. In the switched off condition of the motor, the pressure rollers 11 and 12 impart the force of the two pressure springs 13 and 14 to the cam disc 10. Apart from the theoretical situation in which the said line of symmetry of the cam disc is exactly in line with the centre line of the springs 13 and 14, the rotor 2 will be tilted slightly out of its neutral position under the influence of said pressure forces. Said tilting may take place in the direction shown in FIG. 1, but may also take place in the opposite direction with equal probability. In either case, however, the rotor is moved to a position other than its neutral position, so that starting of the motor upon energization is guaranteed.

The slide 27, the pressure roller 11 and the pressure spring 13 together constitute a vibration system. The resonant frequency of this vibration system has been selected so high by a suitable choise of the masses and the spring characteristics, that the roller 11 constantly remains in contact with the cam 10 also during operation of the motor.

FIG. 4 very schematically shows the most important components of a modification of the apparatus of FIG. 1. Said modification comprises a manually movable actuating member 33 in the form of a lever, which serves for switching on and off the motor 1. The lever is pivotable about a hinge pin 34, which is connected to a fixed part 35 of the apparatus. To said fixed part an end of a tension spring 35 is connected which by its other end is connected to point 37 of the lever 33.

The lever 33 is further provided with a pin 38 which is rigidly connected thereto, which pin is movable in a slot 39 of the second lever 40. At its other end said lever is pivotably connected to the two levers 41 and 42. With the aid of the hinge pins 43 and 44 said levers are pivotably connected to the projecting portions 45 and 46 of the slides 27 and 28. The free end of the lever 33 is movable through a segment of a circle whose ends are denoted by the letters A and C. In point A the motor is switched off, in point C it is switched on and in operation. Approximately in line with the connection line between the pin 34 and the point of attachment 47 of the spring 36 at the fixed part 35, a point B is located between A and C. In the part B-C of the segment of the circle it is assumed that the electric current supply to the motor is interrupted. When the switching lever 33 is moved from the drawn position from A to B, the pin 38 will slide in the slot 39. Once it has arrived at B, the electric current to the motor is applied, so that it will start as described hereinbefore. For moving the lever from position A to position B the counteracting tensile force of the spring 36 is overcome. The tension in the spring 36 will cause the lever to move to point C, once point B has been passed. As the lever 33 is moved further from point C to B, it is consequently propelled by the spring 36, even when the lever were no longer actuated by hand. Briefly after point B has been passed, the pin 38 will have arrived at the end of the slot 39. The pin will now exert a force in the longitudinal direction of the lever 40, so that the two pivots 43 are moved outwards by the moving levers 41 and 42. As a result, the pressure rollers 11 and 12 are moved so far outwards that they can no longer contact the cam disc 10. When the motor is switched off again, the electric current supply to the motor is interrupted first, and once point B has been passed the lever 40 is pulled up again, so that the pressure rollers 11 and 12 can again come into contact with the cam disc 10. The initial situation of FIG. 4 has now been restored again.

What is claimed is:

1. An apparatus which comprises a synchronous motor which is provided with a permanent-magnet diametrically magentized rotor which is disposed between the free ends of the legs of a U-shaped stator core, which is provided with coils disposed around the legs, characterized in that the apparatus comprises a starting device, which is provided with:
    a cam disc which is mounted on the shaft of the rotor,
    one or more pressure members which during starting co-operate with the cam disc, which are movable transverse to the centre line of the rotor shaft and which are movably connected to stationary parts which are connected to the stator, and
    resilient means for loading said pressure members in the direction towards the cam disc.

2. An apparatus as claimed in claim 1, characterized in that during operation of the synchronous motor the pressure members co-operate with the cam disc and that the mechanical vibration system, which comprise each of said pressure member and the movable parts connected thereto, as well as the resilient means have a resonant frequency which is substantially higher than the frequency with which each of said pressure members during operation of the motor is excited by said cam disposed in cam disc.

3. An apparatus as claimed in claim 1, characterized in that
    the cam disc is provided with two cams which are diametrically opposed to each other,
    two pressure members which are disposed opposite each other are provided,
    the pressure members consist of pressure rollers,
    the pressure rollers are each rotatably disposed in a movable slide, and
    each slide is loaded in the direction of the rotor shaft with the aid of a helically wound pressure spring.

4. An apparatus as claimed in claim 1, characterized in that the apparatus further comprises:
    a manually movable actuating member for switching on and off the motor, and
    movable means which are mechanically connected to the actuating member for lifting the pressure members off the cam disc against the pressure of said resilient means at the end of the switching-on movement of the actuating member.

* * * * *